US010084315B2

(12) United States Patent
Okuda et al.

(10) Patent No.: US 10,084,315 B2
(45) Date of Patent: Sep. 25, 2018

(54) POWER CONVERSION DEVICE WITH AN AUTONOMOUS OPERATION FUNCTION

(71) Applicant: Mitsubishi Electric Corporation, Chiyoda-ku (JP)

(72) Inventors: Tatsuya Okuda, Chiyoda-ku (JP); Kikuo Izumi, Chiyoda-ku (JP); Takahiro Kato, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 134 days.

(21) Appl. No.: 14/911,509

(22) PCT Filed: Jul. 4, 2014

(86) PCT No.: PCT/JP2014/067872
§ 371 (c)(1),
(2) Date: Feb. 11, 2016

(87) PCT Pub. No.: WO2015/029597
PCT Pub. Date: Mar. 5, 2015

(65) Prior Publication Data
US 2016/0204691 A1   Jul. 14, 2016

(30) Foreign Application Priority Data

Sep. 2, 2013   (JP) .................................. 2013-181054

(51) Int. Cl.
*H02M 1/32*   (2007.01)
*H02J 3/38*   (2006.01)
(Continued)

(52) U.S. Cl.
CPC .............. *H02J 3/383* (2013.01); *H02M 1/32* (2013.01); *H02M 1/36* (2013.01); *H02M 3/04* (2013.01);
(Continued)

(58) Field of Classification Search
CPC .... H02M 1/32; H02M 1/36; H02M 2001/007; H02M 3/04; H02M 7/44; H02M 7/5395
See application file for complete search history.

(56) References Cited

U.S. PATENT DOCUMENTS 5,329,222 A * 7/1994 Gyugyi ................. H02J 3/1814
                                                 307/102
6,493,245 B1 * 12/2002 Phadke .................. H02H 9/001
                                                 323/908
(Continued)

FOREIGN PATENT DOCUMENTS

JP   9-140164 A   5/1997
JP   10-313540 A   11/1998
(Continued)

OTHER PUBLICATIONS

International Search Report dated Sep. 16, 2014 in PCT/JP14/67872 Filed Jul. 4, 2014.

*Primary Examiner* — Jeffrey Gblende
*Assistant Examiner* — David A. Singh
(74) *Attorney, Agent, or Firm* — Oblon, McClelland, Maier & Neustadt, L.L.P.

(57) ABSTRACT

A power conversion circuit for converting DC power supplied from a DC power supply to AC power; and a power conversion control section for controlling operation of the power conversion circuit so as to generate autonomous operation power as an AC voltage source in a parallel-off state from a power grid. The power conversion control section includes: an AC voltage control section for controlling AC voltage; an AC current suppression section for limiting AC current to a predetermined current limit value or smaller; and a DC voltage shortage suppression section for, when DC voltage of the power conversion circuit reduces, in
(Continued)

response thereto, reducing the current limit value to be given to the AC current suppression section.

16 Claims, 11 Drawing Sheets

(51) Int. Cl.
*H02M 1/36* (2007.01)
*H02M 3/04* (2006.01)
*H02M 7/44* (2006.01)
*H02M 7/5395* (2006.01)
*H02M 1/00* (2006.01)

(52) U.S. Cl.
CPC .......... *H02M 7/44* (2013.01); *H02M 7/5395* (2013.01); *H02M 2001/007* (2013.01); *Y02E 10/563* (2013.01)

(56) References Cited

U.S. PATENT DOCUMENTS

| | | | |
|---|---|---|---|
| 2004/0070280 A1* | 4/2004 | Nakata | H02J 3/32 307/69 |
| 2010/0085784 A1* | 4/2010 | Chou | H02M 1/14 363/45 |
| 2010/0302825 A1* | 12/2010 | Ohshima | H02M 7/53871 363/131 |

FOREIGN PATENT DOCUMENTS

| | | |
|---|---|---|
| JP | 11-164482 A | 6/1999 |
| JP | 2002-291258 A | 10/2002 |
| JP | 3473924 B2 | 12/2003 |
| JP | 2009-131056 A | 6/2009 |
| JP | 2010-110182 A | 5/2010 |

* cited by examiner

POWER CONVERSION DEVICE WITH AN AUTONOMOUS OPERATION FUNCTION

TECHNICAL FIELD

The present invention relates to a power conversion device with an autonomous operation function.

BACKGROUND ART

Conventionally, a power conversion device is proposed which includes a current detection section for directly or indirectly detecting current taken from an inverter, and a current suppression section for reducing output current of the inverter when the current detected by the current detection section is higher than a set value, and thereby, in an autonomous operation performed when, for example, power supply from a power supply system has stopped, enables operation to be performed even when a cleaner or the like which is likely to cause inrush current or a lagging load is connected (for example, see Patent Document 1).

Another conventional power conversion device includes: comparison means for detecting that output of current detection means for detecting current of an inverter has exceeded a predetermined value to cause overcurrent; overcurrent control means for reducing output current of the inverter in response to the detection of overcurrent by the comparison means; and means for switching a semiconductor switch for feeding power from a power grid to a load, to a conductive state, in response to the detection of overcurrent by the comparison means, whereby, even if the conversion device becomes an overload state, shortage power is supplied from the power grid. Thus, an uninterruptible power supply device is realized which is capable of, even when short-time overcurrent occurs within one cycle of output voltage, continuing to supply power to the load without causing the conversion device to fail or stop for protection and without causing reduction or instantaneous interruption of output voltage (for example, see Patent Document 2).

CITATION LIST

Patent Document

Patent Document 1: Japanese Laid-Open Patent Publication No. 2009-131056
Patent Document 2: Japanese Patent No. 3473924

SUMMARY OF THE INVENTION

Problems to be Solved by the Invention

In the conventional technique disclosed in Patent Document 1, in the case where a current suppression value in the current suppression section is set to a high value, if a load beyond rated output of an electric generation element or the power conversion device is connected, the effect of reducing output current of the inverter is small and over-discharge occurs. Therefore, the operation cannot be continued. On the other hand, in the case where the current suppression value is set to a low value, the effect of reducing output current of the inverter becomes too great, so that power that can be outputted is excessively limited, and also, if a cleaner or the like which is likely to cause inrush current is used, by the current suppression section continuing its operation, a so-called motor stalled state occurs in which large current continues to flow while a motor does not rotate and is locked, whereby the motor might be burned.

Further, in Patent Document 1, in the case of using, for supplying power to the power conversion device, an electric generation element such as a solar battery in which generated power greatly varies, setting of the current suppression value is difficult, and therefore it is very difficult to achieve both an operation continuation ability and power that can be outputted.

The conventional example disclosed in Patent Document 2 is based on the premise that, when overcurrent is detected, shortage power for the load is supplied from the power grid. Therefore, in the case where autonomous operation is needed because of electric outage in the power grid, the operation cannot be continued. In addition, if a load such as a motor is connected, supply of power continues without overcurrent being detected by a current limiting circuit, whereby a motor stalled state continues and the motor might be burned.

The present invention has been made to solve the above problems, and an object of the present invention is to provide a power conversion device which, based on the premise that the power conversion device is capable of autonomous operation, minimizes unnecessary stop of operation, reduces continuation of over-discharge state, and has high resistance to disturbance.

Solution to the Problems

A power conversion device according to the present invention includes: a power conversion circuit for converting DC power supplied from a DC power supply to AC power; and a power conversion control section for controlling operation of the power conversion circuit so as to generate autonomous operation power as an AC voltage source in a parallel-off state from a power grid. The power conversion circuit includes: a DC-DC power conversion circuit for converting DC voltage of the DC power supply to DC link voltage; and a DC-AC power conversion circuit for converting the DC link voltage to AC voltage. The power conversion control section includes: an AC voltage control section for controlling the AC voltage of the DC-AC power conversion circuit; an AC current suppression section for limiting AC current of the DC-AC power conversion circuit to a predetermined current limit value or smaller; and a DC voltage shortage suppression section for, when the DC link voltage of the power conversion circuit reduces, in response to the reduction, reducing the current limit value to be given to the AC current suppression section.

Effect of the Invention

According to the present invention, in such a case where an overload state continues and thereby DC voltage becomes equal to or smaller than a predetermined value, the DC voltage shortage suppression section reduces the current limit value to be given to the AC current suppression section, and in response thereto, the AC current suppression section limits current to be supplied to the load. As a result, although power supplied to the load reduces, the maximum power that can be outputted from the storage battery can be continuously supplied to the load, and since continuation of an over-discharge state is suppressed, operation of the power conversion device can be prevented from being unnecessarily stopped due to reduction in DC voltage.

In the case where load power increases during a short time due to inrush current, if the inrush current is equal to or smaller than the current limit value, the AC current suppression section does not operate. Therefore, AC voltage without voltage fluctuation can be supplied to the load. On the other hand, if the inrush current is equal to or greater than the current limit value, in order to protect the power conversion circuit, the AC current suppression section operates to limit current to be supplied to the load, thereby preventing the device from being stopped due to reduction in DC voltage. Thus, it becomes possible to provide a power conversion device with high resistance to disturbance.

DESCRIPTION OF EMBODIMENTS

Embodiment 1

Figure 1:
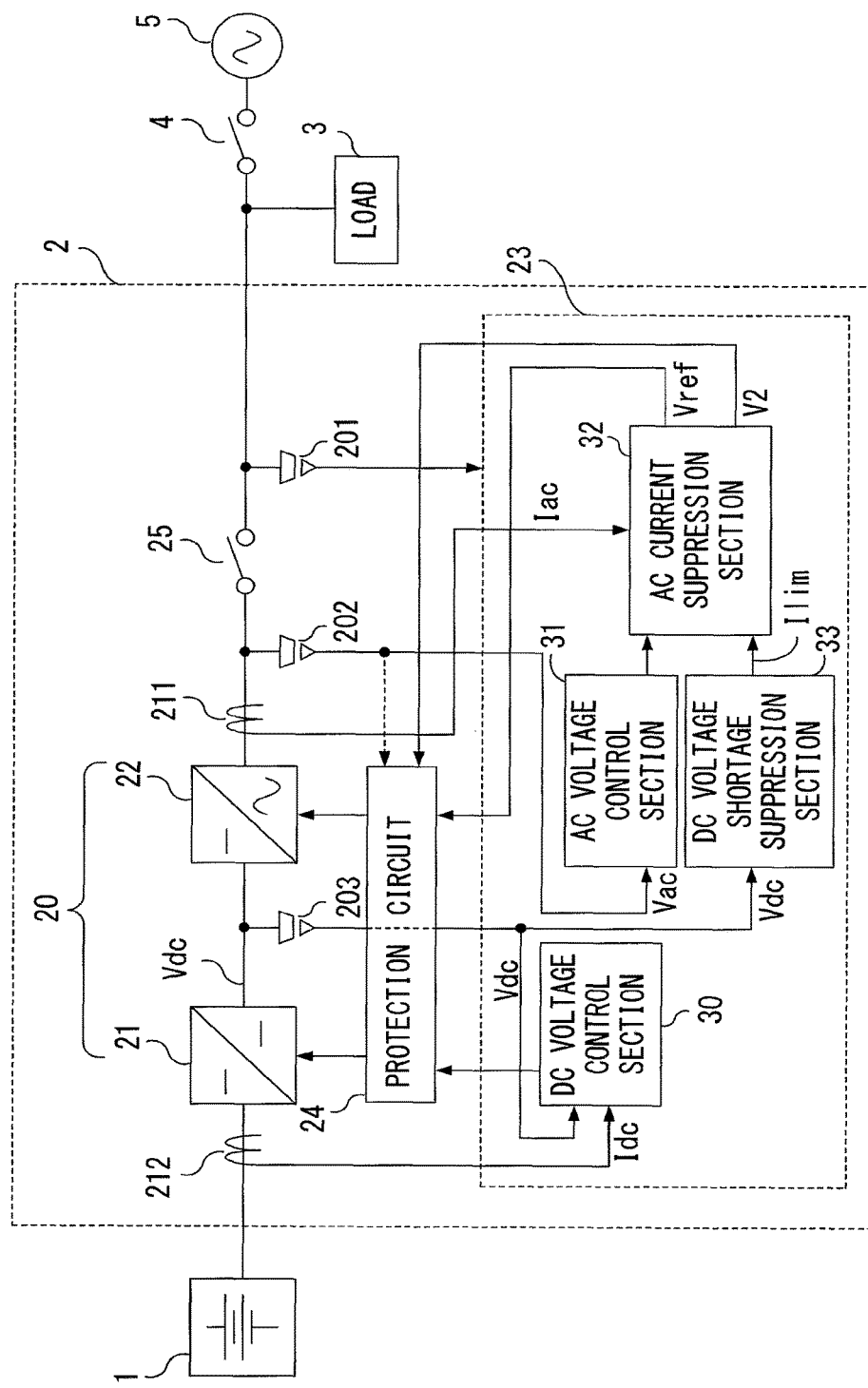
FIG. 1 is a block diagram showing a power conversion device according to embodiment 1 of the present invention.

FIG. 1 is a block diagram showing a power conversion device according to embodiment 1 of the present invention.

A power conversion device 2 in the present embodiment 1 includes: a power conversion circuit 20 composed of a DC-DC power conversion circuit (hereinafter, referred to as a DC/DC conversion circuit) 21 and a DC-AC power conversion circuit (hereinafter, a DC/AC conversion circuit) 22; a power conversion control section 23 for controlling operation of the power conversion circuit 20; a protection circuit 24 for protecting the power conversion circuit 20; a switch device 25; voltage sensors 201 and 202 as a voltage detection circuit for detecting AC voltage; a voltage sensor 203 as a voltage detection circuit for detecting common DC voltage (hereinafter, referred to as a DC link voltage) between the DC/DC conversion circuit 21 and the DC/AC conversion circuit 22; a current sensor 211 as a current detection circuit for detecting AC current; and a current sensor 212 as a current detection circuit for detecting DC current. A storage battery 1 as a DC power supply is connected to a DC side of the power conversion device 2, and a load 3 is connected to an AC side thereof. A power grid 5 is connected to the load 3 via a switch 4.

Here, the power conversion device 2 has a function of converting AC power of the power grid 5 to DC power to charge the storage battery 1, and a function of converting DC power of the storage battery 1 to AC power to supply the AC power to the load 3 or the power grid 5.

In the case where the power grid 5 is normal, the switch 4 is closed, and power is supplied from the power grid 5 to the load 3. The power conversion device 2 operates in an interconnected operation mode while being current-controlled in synchronization with AC voltage of the power grid 5. When the storage battery 1 is discharged, DC power of the storage battery 1 is converted to AC power, and the AC power is supplied to the load 3. When the storage battery 1 is charged, AC power of the power grid 5 is converted to DC power, and the DC power is supplied to the storage battery 1.

On the other hand, in the case of electric outage in the power grid 5, the switch 4 is opened, and the power conversion device 2 and the load 3 are disconnected from the power grid 5. Then, an autonomous operation mode command is inputted to the power conversion device 2 by manual operation or automatic operation such as sequence control, and in response thereto, the power conversion device 2 operates under voltage control, to convert DC power of the storage battery 1 to AC power and supply the AC power to the load 3.

Therefore, the power conversion control section 23 has a function of outputting a command for generating autonomous operation power as an AC voltage source in a parallel-off state from the power grid 5, and includes: a DC voltage control section 30 for controlling DC output voltage of the DC/DC conversion circuit 21; an AC voltage control section 31 for controlling AC voltage of the DC/AC conversion circuit 22; an AC current suppression section 32 for limiting AC current of the DC/AC conversion circuit 22 to a predetermined current limit value or smaller; and a DC voltage shortage suppression section 33 for, when DC link voltage of the power conversion circuit 20 reduces, in response thereto, reducing the current limit value to be given to the AC current suppression section 32.

Hereinafter, the details of the DC voltage control section 30, the AC voltage control section 31, the AC current suppression section 32, and the DC voltage shortage suppression section 33 will be described.

Figure 2:
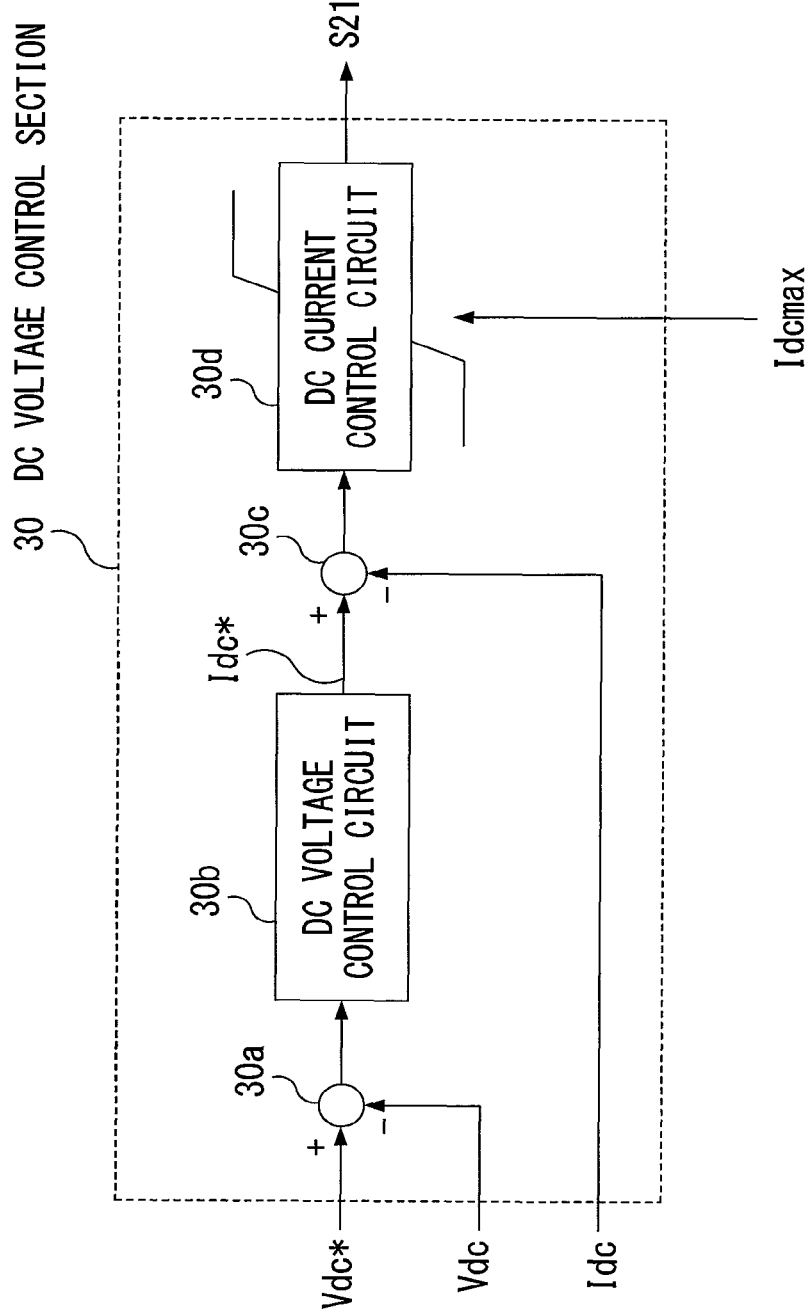
FIG. 2 is a control block diagram of a DC voltage control section according to embodiment 1 of the present invention.

FIG. 2 is a control block diagram of the DC voltage control section 30.

The DC voltage control section 30 includes: a DC voltage controller composed of a subtractor 30a and a DC voltage control circuit 30b; and a DC current controller composed of a subtractor 30c and a DC current control circuit 30d.

The DC voltage controller detects the DC link voltage by the voltage sensor 203, and calculates a difference between the DC link voltage detection value Vdc and a predetermined DC link voltage command value Vdc*, by the subtractor 30a. Next, by the DC voltage control circuit 30b, the DC voltage controller performs general feedback control such as proportional integral control so that the difference between the DC link voltage detection value Vdc and the DC link voltage command value Vdc* becomes zero, that is, the DC link voltage detection value Vdc coincides with the DC link voltage command value Vdc*, and the DC voltage controller generates a charge/discharge current command value Idc* for the storage battery 1.

The DC current controller detects charge/discharge current of the storage battery 1 by the current sensor 212, and calculates a difference between the charge/discharge current detection value Idc and the charge/discharge current command value Idc*, by the subtractor 30c. Next, by the DC current control circuit 30d, the DC current controller performs general feedback control such as proportional integral control so that the difference between the charge/discharge current detection value Idc and the charge/discharge current command value Idc* becomes zero, that is, the charge/discharge current detection value Id coincides with the charge/discharge current command value Idc*, and the DC current controller generates a drive signal S21 for the DC/DC conversion circuit 21. The DC current control circuit 30d is provided with a current limiter for performing limitation so as not to exceed the maximum charge/discharge current Idcmax that is permissible for the storage battery 1.

In the case of electric outage in the power grid 5, if power consumed by the load 3 is equal to or smaller than the maximum discharge power of the storage battery 1, the DC link voltage is maintained at a predetermined value (DC link voltage command value Vdc*) by the DC/DC conversion circuit 21, but if power consumed by the load 3 becomes equal to or greater than the maximum discharge power of the storage battery 1 (that is, discharge current of the storage battery 1 is limited by the current limiter of the DC current control circuit 30d), the DC link voltage reduces.

Figure 3:
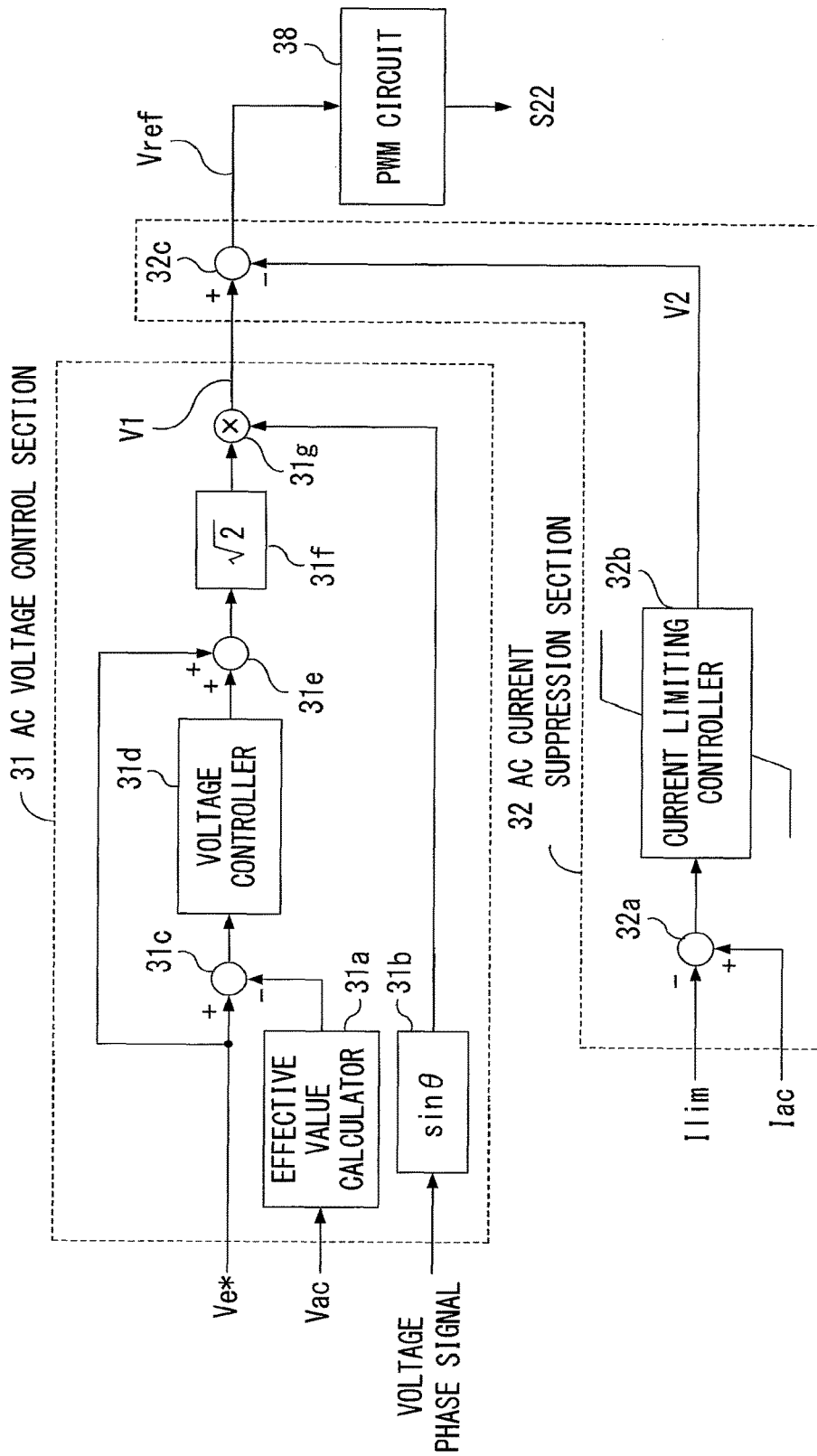
FIG. 3 is a control block diagram of an AC voltage control section and an AC current suppression section according to embodiment 1 of the present invention.

FIG. 3 is a control block diagram of the AC voltage control section 31 and the AC current suppression section 32.

The AC voltage control section 31 detects AC voltage outputted from the DC/AC conversion circuit 22 by the voltage sensor 202, calculates an effective value of the AC voltage detection value Vac by an effective value calculator 31a, and calculates a difference between the obtained effective value and a predetermined voltage effective value command value Ve* by a subtractor 31c. Next, by a voltage controller 31d, an adder 31e, a root-of-two multiplier 31f, a voltage phase generator 31b, and a multiplier 31g, the AC voltage control section 31 performs general feedback control such as proportional integral control, and feedforward control, so that the difference between the effective value of AC voltage and the voltage effective value command value Ve* becomes zero, that is, the effective value coincides with the voltage effective value command value Ve*, thereby generating an AC voltage command signal V1.

Meanwhile, the AC current suppression section 32 detects AC current outputted from the DC/AC conversion circuit 22 of the power conversion device 2 by the current sensor 211, and calculates a difference between the AC current detection value Iac and a predetermined current limit value Ilim given from the DC voltage shortage suppression section 33 described later, by a subtractor 32a. Next, by a current limiting controller 32b, the AC current suppression section 32 performs general feedback control such as proportional integral control so that the AC current detection value Iac does not exceed the current limit value Ilim, thereby generating a voltage correcting signal V2. Next, the AC current suppression section 32 subtracts the voltage correcting signal V2 from the AC voltage command signal V1 outputted from the AC voltage control section 31, by a subtractor 32c, thereby generating an AC voltage command value Vref (=V1−V2) for the DC/AC conversion circuit 22. The AC voltage command signal V1 and the voltage correcting signal V2 correspond to respective command values in claims (claim 5).

The AC voltage command value Vref thus obtained is given to a PWM (Pulse Width Moduration) circuit 38 at the subsequent stage. The PWM circuit 38 performs pulse width modulation for the AC voltage command value Vref, and performs dead time correction (not shown) as necessary, thereby generating a drive signal S22 for the DC/AC conversion circuit 22. The DC/AC conversion circuit 22 generates AC voltage through switching operation according to the drive signal S22.

Only when the absolute value of the AC current detection value Iac exceeds the current limit value Ilim, the AC current suppression section 32 starts operation to limit AC current outputted from the DC/AC conversion circuit 22, thereby reducing the amplitude of the AC voltage command signal V1. When the AC current detection value Iac is equal to or smaller than the current limit value Ilim, the AC current suppression section 32 does not operate basically.

During a period in which the AC current suppression section 32 operates, the amplitude of the AC voltage command signal V1 momentarily reduces, but the voltage effective value is maintained at a desired value (voltage effective value command value Ve*) by the AC voltage control section 31.

Figure 4:
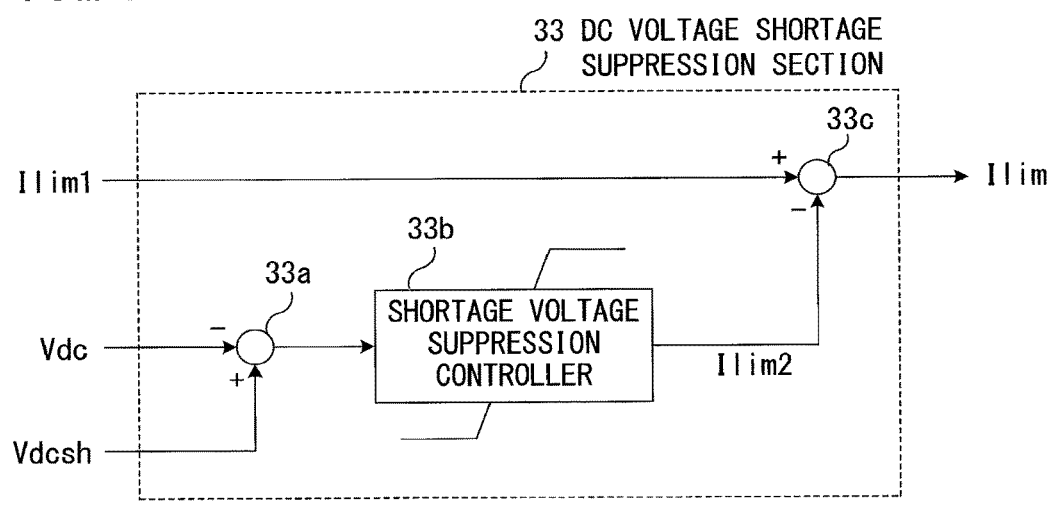
FIG. 4 is a control block diagram of a DC voltage shortage suppression section according to embodiment 1 of the present invention.

FIG. 4 is a control block diagram of the DC voltage shortage suppression section 33.

The DC voltage shortage suppression section 33 detects the DC link voltage by the voltage sensor 203, and calculates a difference between the DC link voltage detection value Vdc and a predetermined DC voltage threshold value Vdcsh, by a subtractor 33a. Next, by a shortage voltage suppression controller 33b, the DC voltage shortage suppression section 33 performs general feedback control such as proportional integral control so that the difference between the DC link voltage detection value Vdc and the DC voltage threshold value Vdcsh becomes zero, that is, the DC link voltage detection value Vdc does not become smaller than the DC voltage threshold value Vdcsh, thereby calculating a current correcting signal Ilim2. Then, the DC voltage shortage suppression section 33 subtracts the current correcting signal Ilim2 from a predetermined AC current upper limit value Ilim1 by a subtractor 33c, thereby generating the current limit value Ilim (=Ilim1−Ilim2).

Here, the AC current upper limit value Ilim1 is an upper limit value for AC current outputted from the DC/AC conversion circuit 22, and is set to a fixed value for protecting the power conversion device 2. The predetermined DC voltage threshold value Vdcsh is voltage for the DC voltage shortage suppression section 33 to start operation, and is set to a smaller value than the DC link voltage command value Vdc* (see FIG. 2) set in advance for the aforementioned DC voltage control section 30.

Thus, only when the DC link voltage detection value Vdc becomes smaller than the predetermined DC voltage threshold value Vdcsh, that is, only when power consumed by the load 3 becomes equal to or greater than the maximum discharge power of the storage battery 1, the DC voltage shortage suppression section 33 operates to reduce the current limit value Ilim, whereby AC current to be supplied to the load 3 is limited by the AC current suppression section 32. When power consumed by the load 3 is equal to or smaller than the maximum discharge power of the storage battery 1, the DC voltage shortage suppression section 33 does not operate basically.

Next, mutually related control operation of the AC current suppression section 32 and the DC voltage shortage suppression section 33 will be described.

In the case where such a load 3 that causes excessive current to flow for only a short time is connected, inrush current might occur. However, in this case, if the time during which the excessive current flows is such a short time that the DC link voltage detection value Vdc does not become equal to or smaller than the DC voltage threshold value Vdcsh, the DC voltage shortage suppression section 33 does not operate, and the current limit value Ilim is equal to the AC current upper limit value Ilim1 (Ilim=Ilim1). In this case, if the inrush current is equal to or smaller than the current limit value Ilim, the AC current suppression section 32 also does not operate, and therefore, AC voltage without voltage fluctuation can be supplied to the load 3. If the inrush current is equal to or greater than the current limit value Ilim, in order to protect the power conversion device 2, the AC current suppression section 32 operates to limit current to be supplied to the load, to the current limit value Ilim (=Ilim1).

On the other hand, in the case where such a load 3 that causes excessive current to flow for a comparatively long time is connected, the DC link voltage detection value Vdc becomes equal to or smaller than the DC voltage threshold value Vdcsh, and thus the DC voltage shortage suppression section 33 operates to reduce the current limit value Ilim. At this time, if the AC current detection value Iac exceeds the current limit value Ilim, the AC current suppression section 32 operates to reduce the AC voltage command value Vref, thereby limiting the AC output current. As a result, the current limit value Ilim is reduced to such a value that allows the DC link voltage detection value Vdc to be maintained at the DC voltage threshold value Vdcsh, that is, reduced until power supplied to the load 3 becomes almost the same as the maximum discharge power of the storage battery 1. Thus, although power supplied to the load 3 reduces, the maximum power that can be outputted from the storage battery 1 can be continuously supplied to the load 3.

If the maximum charge/discharge current Idcmax that is permissible for the storage battery 1 reduces due to reduction in the SOC (State Of Charge) of the storage battery 1 or temperature increase of the storage battery 1, discharge current of the storage battery 1 is reduced by limiter operation by the DC current control circuit 30d of the DC voltage control section 30. Along with this, power flowing from the DC/DC conversion circuit 21 to the DC/AC conversion circuit 22 reduces. In such a case, the DC link voltage detection value Vdc also reduces, and in response thereto, the current limit value Ilim is reduced by the DC voltage shortage suppression section 33, so that power supplied to the load 3 decreases and the DC link voltage is maintained at a constant value. As a result, although AC voltage outputted from the DC/AC conversion circuit 22 reduces, the operation can be continued with the maximum charge/discharge current Idcmax of the storage battery 1.

Thus, in the present embodiment 1, the operation can be continued even if the maximum charge/discharge current Idcmax of the storage battery 1 is rapidly changed.

Next, the protection circuit 24 will be described.

The protection circuit 24 has not only a protection function for detecting voltage, current, temperature, and the like of the power conversion circuit 20, and upon abnormality such as overload or overvoltage, stopping operation of the power conversion circuit 20 in order to prevent breakdown of the power conversion circuit 20, but also a load protection function for preventing breakdown of the load 3. Hereinafter, operation of, particularly, the load protection function of the protection circuit 24 will be described.

In some of motor loads such as a cleaner or a compressor, or non-linear loads of capacitor-input type, inrush current that is several times or more greater than rated current flows at the time of starting. If the inrush current of such a load 3 is equal to or greater than the current limit value Ilim, AC current outputted from the DC/AC conversion circuit 22 is limited to the current limit value Ilim by the AC current suppression section 32. At this time, in the case where the load 3 is a motor as an example, if the current limit value Ilim is set to be equal to or smaller than current required to start the motor, the motor is not started but overcurrent continues to flow while the motor is left in a locked state. As a result, a motor stalled state occurs, whereby the motor might be burned.

In order to prevent such motor burning, if the AC current suppression section 32 has continued operation to limit the AC current to the current limit value Ilim or smaller for a predetermined time or longer, in other words, if the AC current suppression section 32 has continued to output the voltage correcting signal V2 for a predetermined time or longer, the protection circuit 24 determines that the load 3 is in an overload state, and stops operation of the power conversion circuit 20. Owing to the load protection function of the protection circuit 24, even in the case where a motor is connected as the load 3, it becomes possible to avoid burning of the load 3 due to continuation of a motor stalled state, thus realizing a power conversion device with high reliability.

In the above description, as the determination condition in the load protection function of the protection circuit 24, a condition that the AC current suppression section 32 has continued the operation for a predetermined time or longer has been used. However, without limitation thereto, for example, the determination condition in the overload protection function may be that a state in which the AC voltage effective value obtained based on the AC voltage detection value Vac detected by the voltage sensor 202 is equal to or smaller than a predetermined threshold voltage has continued for a predetermined time or longer. Alternatively, the determination condition in the overload protection function may be that a difference voltage between the AC voltage command value Vref generated by the AC voltage control section 31 and an AC voltage instantaneous value based on the AC voltage detection value Vac detected by the voltage sensor 202 is equal to or greater than a predetermined threshold voltage has continued for a predetermined time or longer.

Thus, owing to the load protection function of the protection circuit 24, in the case where inrush current continues due to, for example, continuation of a motor stalled state, operation of the power conversion circuit 20 is stopped, whereby burning of the load 3 can be avoided and the power conversion device 2 with high reliability can be realized.

Figure 5:
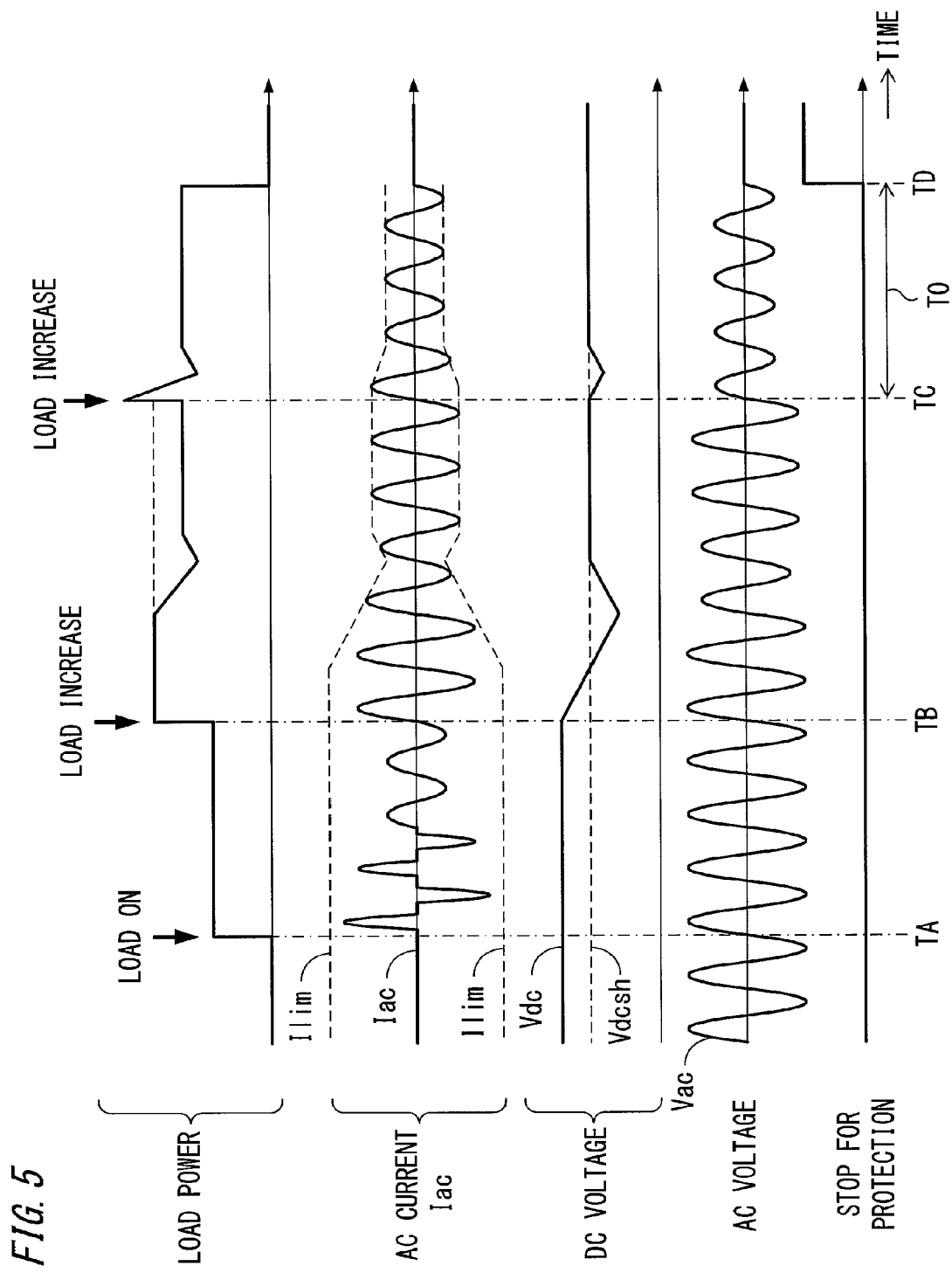
FIG. 5 is a time chart for explaining operation of the power conversion device according to embodiment 1 of the present invention.

FIG. 5 is a time chart for explaining operation of the power conversion device according to embodiment 1 of the present invention. Here, the case where a non-linear load of capacity-input type or a motor load, which causes inrush current to flow at the time of starting, is connected as the load 3 will be described.

At time TA when the load 3 is started, inrush current equal to or greater than rated current of the load 3 flows. In the embodiment of the present invention, since the AC current upper limit value Ilim1 can be set to a comparatively great value, current limitation is hardly exerted for a short-time inrush current, and current is supplied to the load 3 without distortion of AC voltage.

At time TB when power consumed by the load 3 increases to be equal to or greater than the maximum discharge power of the storage battery 1, the DC link voltage detection value Vdc reduces to the DC voltage threshold value Vdcsh, and AC current outputted from the DC/AC conversion circuit 22 is limited by the AC current suppression section 32. As a result, although the amplitude of the AC voltage reduces, the operation is continued with the maximum discharge power of the storage battery 1.

At time TC when power consumed by the load 3 further increases, since AC current outputted from the DC/AC conversion circuit 22 is limited by the AC current suppression section 32, the amplitude of the AC voltage further reduces. If the amplitude of the AC voltage reduces below a permissible operation voltage range of the load 3, the load 3 might become unable to operate normally. Therefore, in this example, if a state in which the AC voltage effective value obtained based on the AC voltage detection value Vac detected by the voltage sensor 202 is equal to or smaller than a predetermined effective value threshold voltage continues during a predetermined time To or longer, to reach time TD, the protection circuit 24 operates to stop operation of the power conversion circuit 20.

As described above, in the present embodiment 1, the power conversion control section 23 includes: the AC voltage control section 31 for controlling the AC voltage; the AC current suppression section 32 for suppressing the AC current to be equal to or smaller than the predetermined current limit value Ilim; and the DC voltage shortage suppression section 33 for, when the DC voltage of the power conversion circuit 20 reduces, in response thereto, reducing the current limit value Ilim to be given to the AC current suppression section 32. When the DC link voltage detection value Vdc is equal to or smaller than the predetermined DC voltage threshold value Vdcsh, the DC voltage shortage suppression section 33 reduces the current limit value Ilim. Thus, the device can be prevented from being stopped due to reduction in DC voltage in an overload state, and even a load 3 that causes great inrush current can be supplied with power.

The protection circuit 24 has not only a protection function for preventing breakdown of the power conversion circuit 20, but also a load protection function with a time limit element for stopping operation of the power conversion circuit 20 when AC current suppression control by the AC current suppression section 32 has continued for a predetermined time. Therefore, in the case where overcurrent continues for such a reason that a motor stalled state continues, operation of the power conversion circuit 20 is stopped, whereby burning of the load 3 can be avoided.

In the present embodiment 1, the case where the storage battery 1 is connected as the DC power supply has been described. However, without limitation thereto, natural energy such as a solar battery or wind power generation may be utilized as the DC power supply, or AC power may be converted to DC power through a diode rectification circuit, a PFC (Power Factor Correction) circuit, a high-power-factor converter, or the like, to obtain the DC power supply. The DC voltage control section 30 is not limited to the configuration shown in FIG. 2, but may only include the DC voltage controller composed of the subtractor 30a and the DC voltage control circuit 30b.

Embodiment 2

Figure 6:
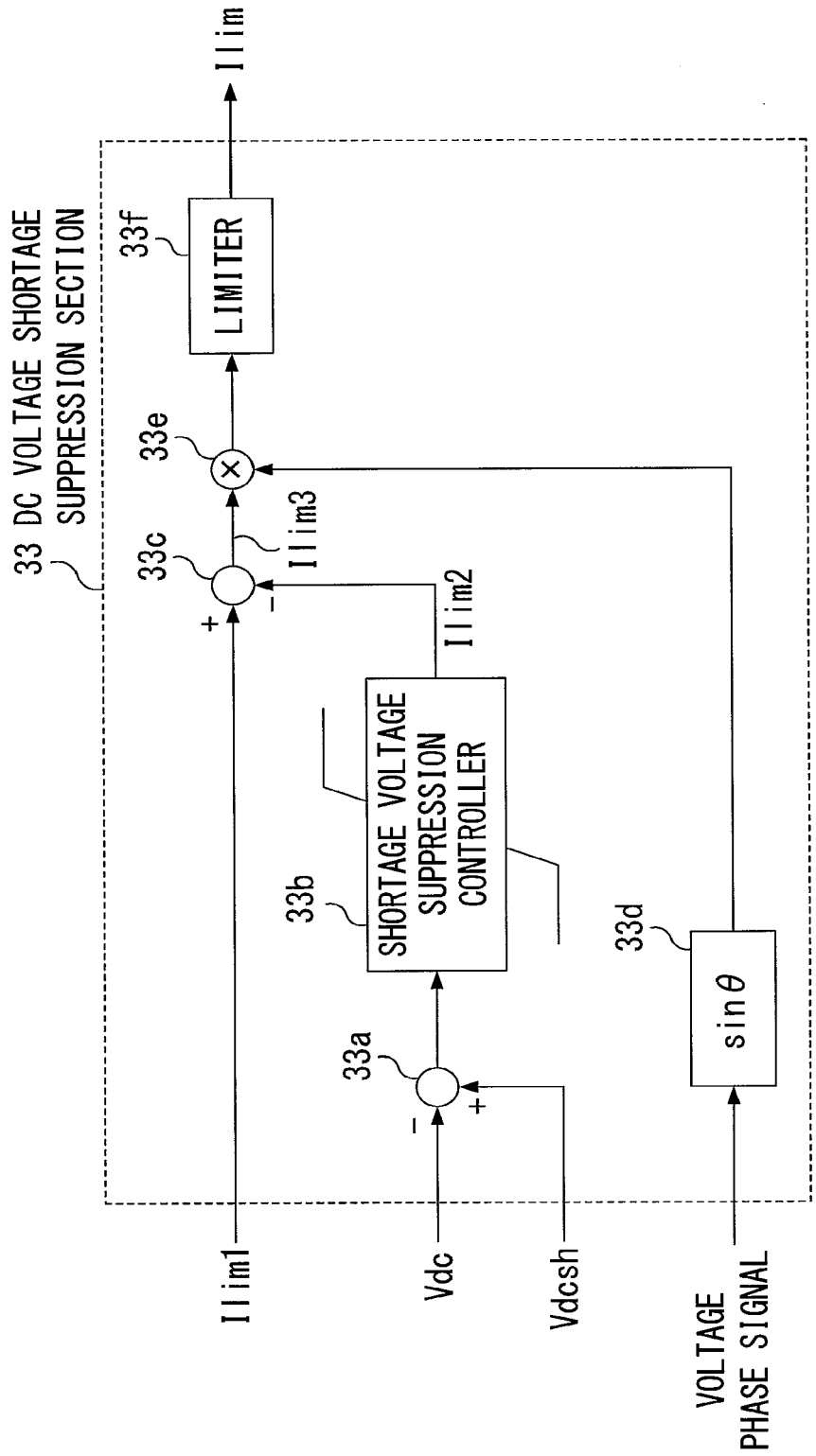
FIG. 6 is a control block diagram of a DC voltage shortage suppression section of a power conversion device according to embodiment 2 of the present invention.

FIG. 6 is a control block diagram of a DC voltage shortage suppression section according to embodiment 2 of the present invention. The components that correspond to or are the same as those in the DC voltage shortage suppression section of embodiment 1 shown in FIG. 4 are denoted by the same reference characters.

The present embodiment 2 is different from the above embodiment 1 in how the current limit value Ilim is generated by the DC voltage shortage suppression section 33. The other configuration of the power conversion device 2 is the same as in embodiment 1, and therefore the detailed description thereof is omitted here.

As in embodiment 1, the DC voltage shortage suppression section 33 of embodiment 2 operates only when the DC link voltage detection value Vdc becomes lower than the predetermined DC voltage threshold value Vdcsh. That is, the DC voltage shortage suppression section 33 detects the DC link voltage by the voltage sensor 203, and calculates a difference between the DC link voltage detection value Vdc and the predetermined DC voltage threshold value Vdcsh, by the subtractor 33a. Next, by the shortage voltage suppression controller 33b, the DC voltage shortage suppression section 33 performs general feedback control such as proportional integral control so that the DC link voltage detection value Vdc does not become smaller than the DC voltage threshold value Vdcsh, thereby calculating the current correcting signal Ilim2. Then, the DC voltage shortage suppression section 33 subtracts the current correcting signal Ilim2 from the predetermined AC current upper limit value Ilim1 by the subtractor 33c, thereby generating a peak current limit value Ilim3 (=Ilim1−Ilim2). Restrictions on the AC current upper limit value Ilim1 and the DC voltage threshold value Vdcsh in this case are also the same as in embodiment 1.

Next, by a multiplier 33e, the DC voltage shortage suppression section 33 multiplies the peak current limit value Ilim3 by a sine-wave signal sine which is obtained by a voltage phase generator 33d and synchronized with the AC voltage command value Vref, and outputs the multiplied value as the current limit value Ilim (=Ilim3×sin θ). Next, by a limiter 33f, the DC voltage shortage suppression section 33 limits the absolute value of the current limit value Ilim so as not to become equal to or smaller than a predetermined value Δ. Thus, the current limit value Ilim in this case is not a fixed value as in embodiment 1, but is represented as a sine wave with a limiter, which sine wave is synchronized with the AC voltage command value Vref.

Figure 7:
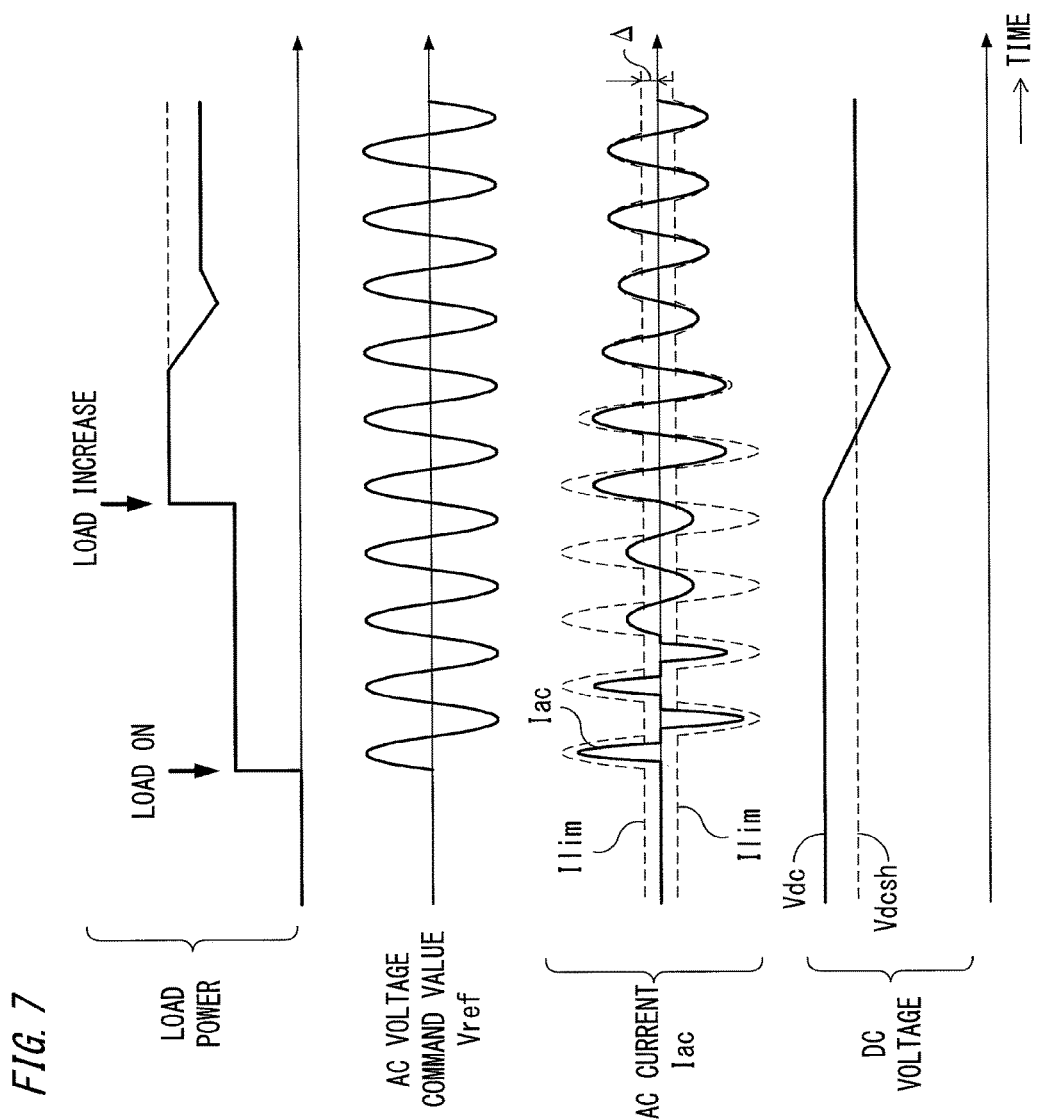
FIG. 7 is a time chart for explaining operation of the power conversion device according to embodiment 2 of the present invention.

FIG. 7 is a time chart for explaining operation of the power conversion device 2 according to embodiment 2 of the present invention.

The basic operation in this case is the same as in the above embodiment 1. However, the current limit value Ilim is not a fixed value, but is represented as a sine wave with a limiter, which sine wave is synchronized with the AC voltage command value Vref and is limited so that the absolute value thereof does not become equal to or smaller than the predetermined value Δ, as described above.

Owing to the above configuration, even if a non-linear load of capacitor-input type is started with capacitor initial voltage being zero, AC current outputted from the DC/AC conversion circuit 22 of the power conversion circuit 20 can be swiftly suppressed, thus enabling smooth starting like soft start.

Since reactive power outputted from the power conversion device 2 can be more aggressively limited than active power outputted therefrom, reduction in active power output due to reactive power output can be minimized, and thus the rated capacity of the power conversion device 2 can be maximally utilized.

Embodiment 3

Figure 8:
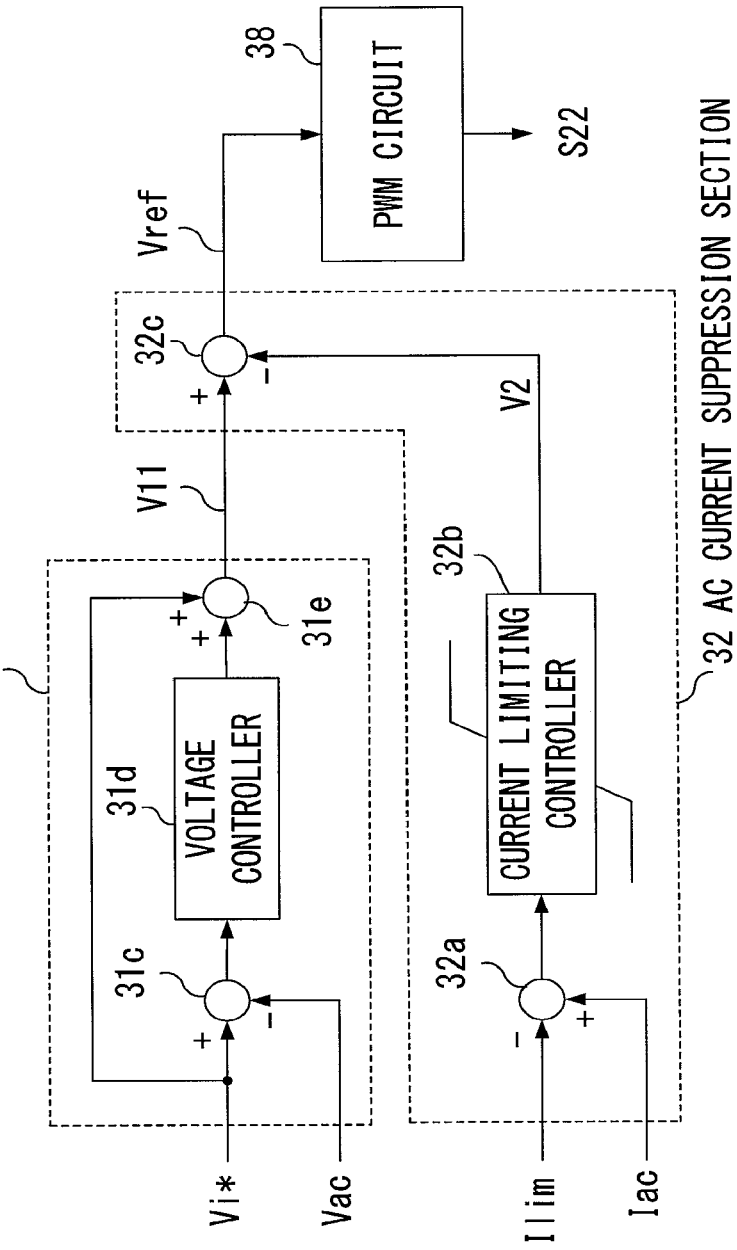
FIG. 8 is a control block diagram of an AC voltage control section and an AC current suppression section of a power conversion device according to embodiment 3 of the present invention.

FIG. 8 is a control block diagram of an AC voltage control section and an AC current suppression section according to embodiment 3 of the present invention. The components that correspond to or are the same as those in the AC voltage control section and the AC current suppression section of embodiment 1 shown in FIG. 3 are denoted by the same reference characters.

The present embodiment 3 is different from the above embodiment 1 in that the AC voltage control section 31 controls instantaneous voltage instead of controlling the voltage effective value. The other configuration of the power conversion device 2 is the same as in embodiment 1, and therefore the detailed description thereof is omitted here.

The AC voltage control section 31 detects AC voltage outputted from the DC/AC conversion circuit 22 of the power conversion device 2 by the voltage sensor 202, and calculates a difference between the AC voltage detection value Vac and a predetermined AC instantaneous value command value Vi* by the subtractor 31c. Next, by the voltage controller 31d and the adder 31e, the AC voltage control section 31 performs general feedback control such as proportional integral control, and feedforward control, so that the difference between the AC voltage detection value Vac and the AC instantaneous value command value Vi* becomes zero, that is, the AC voltage detection value Vac coincides with the AC instantaneous value command value Vi*, thereby generating an AC voltage command signal V11.

As in embodiment 1, only when the absolute value of the AC current detection value Iac exceeds the current limit value Ilim, the AC current suppression section 32 starts operation to limit AC current outputted from the DC/AC conversion circuit 22, thereby reducing the amplitude of the AC voltage command signal V11. That is, the AC current suppression section 32 detects AC current outputted from the DC/AC conversion circuit 22 of the power conversion device 2 by the current sensor 211, and calculates a difference between the AC current detection value Iac and the current limit value Ilim given from the DC voltage shortage suppression section 33, by the subtractor 32a. Next, by the current limiting controller 32b, the AC current suppression section 32 performs general feedback control such as proportional integral control so that the AC current detection value Iac does not exceed the current limit value Ilim, thereby generating the voltage correcting signal V2. Next, the AC current suppression section 32 subtracts the voltage correcting signal V2 from the AC voltage command signal V11 outputted from the AC voltage control section 31, by the subtractor 32c, thereby generating the AC voltage command value Vref (=V11−V2) for the DC/AC conversion circuit 22.

In the present embodiment 3, the AC voltage control section 31 controls the instantaneous voltage instead of controlling the voltage effective value as described above. Therefore, in order to reliably correct the AC voltage command signal V11 from the AC voltage control section 31 by the voltage correcting signal V2 from the AC current suppression section 32, feedback control response of the AC current suppression section 32 is set to be sufficiently faster than feedback control response of the AC voltage control section 31. This can be achieved by, for example, setting an integral time constant of the current limiting controller 32b of the AC current suppression section 32 to be smaller than an integral time constant of the voltage controller 31d of the AC voltage control section 31.

Thus, it becomes possible to suppress overcurrent in the case of overload, while applying a predetermined AC voltage to the load 3 in normal case, and thus the power conversion device 2 with high overload resistance can be achieved.

Figure 9:
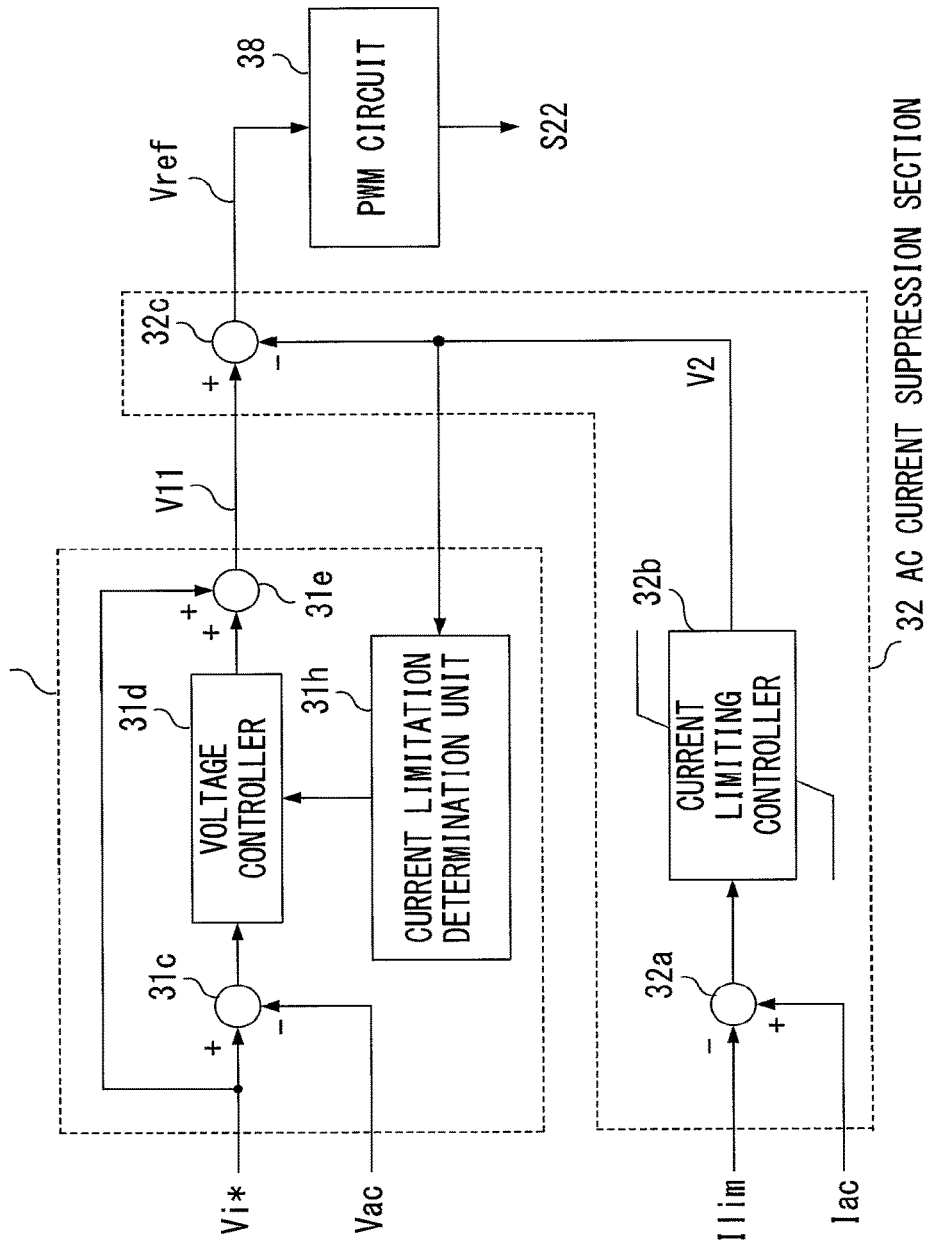
FIG. 9 is a control block diagram showing a modification of the AC voltage control section and the AC current suppression section of the power conversion device according to embodiment 3 of the present invention.

FIG. 9 is a control block diagram showing modification of the AC voltage control section and the AC current suppression section according to embodiment 3 of the present invention. The components that correspond to or are the same as those in the AC voltage control section and the AC current suppression section shown in FIG. 8 are denoted by the same reference characters.

The configuration in FIG. 9 is different from the configuration in FIG. 8 in that the AC voltage control section 31 additionally includes a current limitation determination unit 31h, and the voltage correcting signal V2 outputted from the AC current suppression section 32 is inputted to the current limitation determination unit 31h. The other configurations of the AC voltage control section 31 and the AC current suppression section 32 are the same as in FIG. 8, and therefore the detailed description thereof is omitted here.

Here, the current limitation determination unit 31h determines whether or not the voltage correcting signal V2 from the AC current suppression section 32 is inputted, that is, whether or not the AC current suppression section 32 is operating. When the AC current suppression section 32 is operating to perform current limitation, the current limitation determination unit 31h reduces an integral gain of the voltage controller 31d of the AC voltage control section 31 or makes the integral gain be zero, to stop the integral control.

Thus, in control of the instantaneous voltage by the AC voltage control section 31, it is possible to prevent malfunction such as control overflow or hunting caused by the AC voltage command signal V11 unnecessarily increasing through integral operation in feedback control by the AC voltage control section 31 during a period in which the AC current suppression section 32 is operating. Therefore, it is possible to prevent voltage oscillation due to the AC voltage control section 31 immediately after current suppression operation of the AC current suppression section 32 is finished, and therefore more stable AC voltage can be outputted to the load 3.

Embodiment 4

Figure 10:
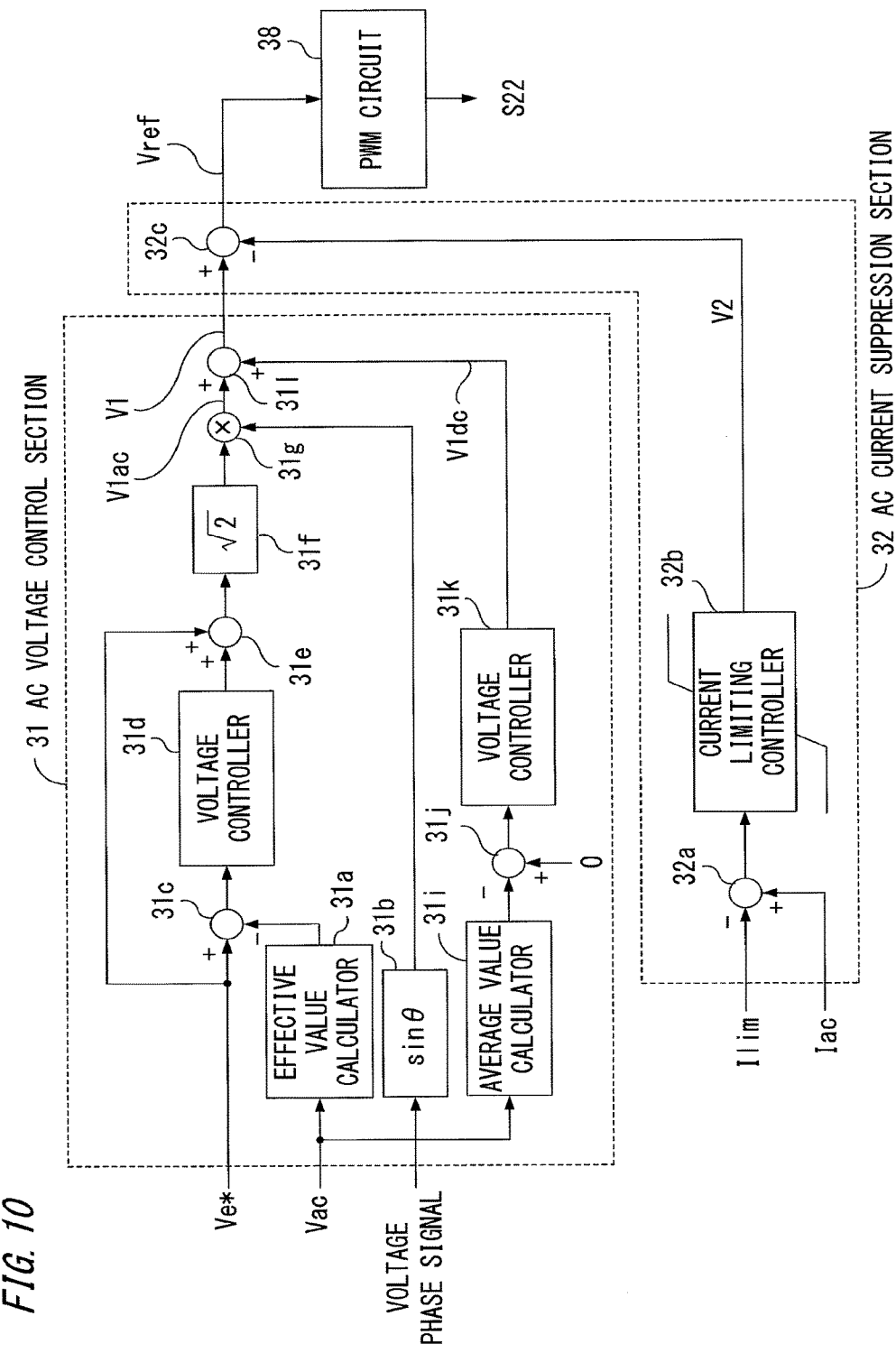
FIG. 10 is a control block diagram of an AC voltage control section and an AC current suppression section of a power conversion device according to embodiment 4 of the present invention.

FIG. 10 is a control block diagram of an AC voltage control section 31 and an AC current suppression section 32 according to embodiment 4 of the present invention. The same components that correspond to or are the same as those in the AC voltage control section and the AC current suppression section of embodiment 1 shown in FIG. 3 are denoted by the same reference characters.

The present embodiment 4 is different from the above embodiment 1 in how the AC voltage command signal V1 is generated by the AC voltage control section 31. The other configuration of the power conversion device 2 is the same as in embodiment 1, and therefore the detailed description thereof is omitted.

The AC voltage control section 31 detects AC voltage outputted from the DC/AC conversion circuit 22 by the voltage sensor 202, calculates an effective value of the AC voltage detection value Vac by the effective value calculator 31a, and calculates a difference between the obtained effective value and the predetermined voltage effective value command value Ve* by the subtractor 31c. Next, by the voltage controller 31d, the adder 31e, the root-of-two multiplier 31*f*, the voltage phase generator 31*b*, and the multiplier 31*g*, the AC voltage control section 31 performs general feedback control such as proportional integral control, and feedforward control, so that the difference between the effective value of AC voltage and the voltage effective value command value Ve* becomes zero, that is, the effective value of the AC voltage coincides with the voltage effective value command value Ve*, thereby generating an AC component V1*ac* of the AC voltage command signal V1.

In addition, the AC voltage control section 31 calculates an average value of the AC voltage detection value Vac by an average value calculator 31*i*, calculates a difference between the obtained average value and a predetermined voltage average command value (in FIG. 10, zero) by a subtractor 31*j*, and performs general feedback control such as proportional integral control so that the average value of AC voltage becomes zero, by a voltage controller 31*k*, thereby generating a DC component V1*dc* of the AC voltage command signal V1. Here, the average value calculator 31*i*, the subtractor 31*j*, and the voltage controller 31*k* for the AC voltage detection value Vac correspond to a "DC component suppression section" in claims.

Then, the AC voltage control section 31 adds the generated AC component V1*ac* of the AC voltage command signal V1 and the generated DC component V1*dc* of the AC voltage command signal V1 by an adder 31*l*, thereby generating the AC voltage command signal V1. Here, "adding or subtracting offset voltage to or from the AC voltage command value" in claims corresponds to adding the DC component V1*dc* of the AC voltage command signal V1 by the adder 31*l* to generate the AC voltage command signal V1.

As in embodiment 1, only when the absolute value of the AC current detection value Iac exceeds the current limit value Ilim, the AC current suppression section 32 starts operation to limit AC current outputted from the DC/AC conversion circuit 22, thereby reducing the amplitude of the AC voltage command signal V1. That is, the AC current suppression section 32 detects AC current outputted from the DC/AC conversion circuit 22 of the power conversion device 2 by the current sensor 211, and calculates a difference between the AC current detection value Iac and the current limit value Ilim given from the DC voltage shortage suppression section 33, by the subtractor 32*a*. Next, by the current limiting controller 32*b*, the AC current suppression section 32 performs general feedback control such as proportional integral control so that the AC current detection value Iac does not exceed the current limit value Ilim, thereby generating the voltage correcting signal V2. Next, the AC current suppression section 32 subtracts the voltage correcting signal V2 from the AC voltage command signal V1 outputted from the AC voltage control section 31, by the subtractor 32*c*, thereby generating the AC voltage command value Vref (=V1−V2) for the DC/AC conversion circuit 22.

Owing to the above configuration, a DC voltage component contained in AC voltage outputted from the power conversion device 2 can be suppressed. Therefore, even if a transformer-input-type load is connected as the load 3, magnetic saturation due to biased magnetization in the transformer can be prevented, and thus the power conversion device 2 with improved operation stability is achieved.

Figure 11:
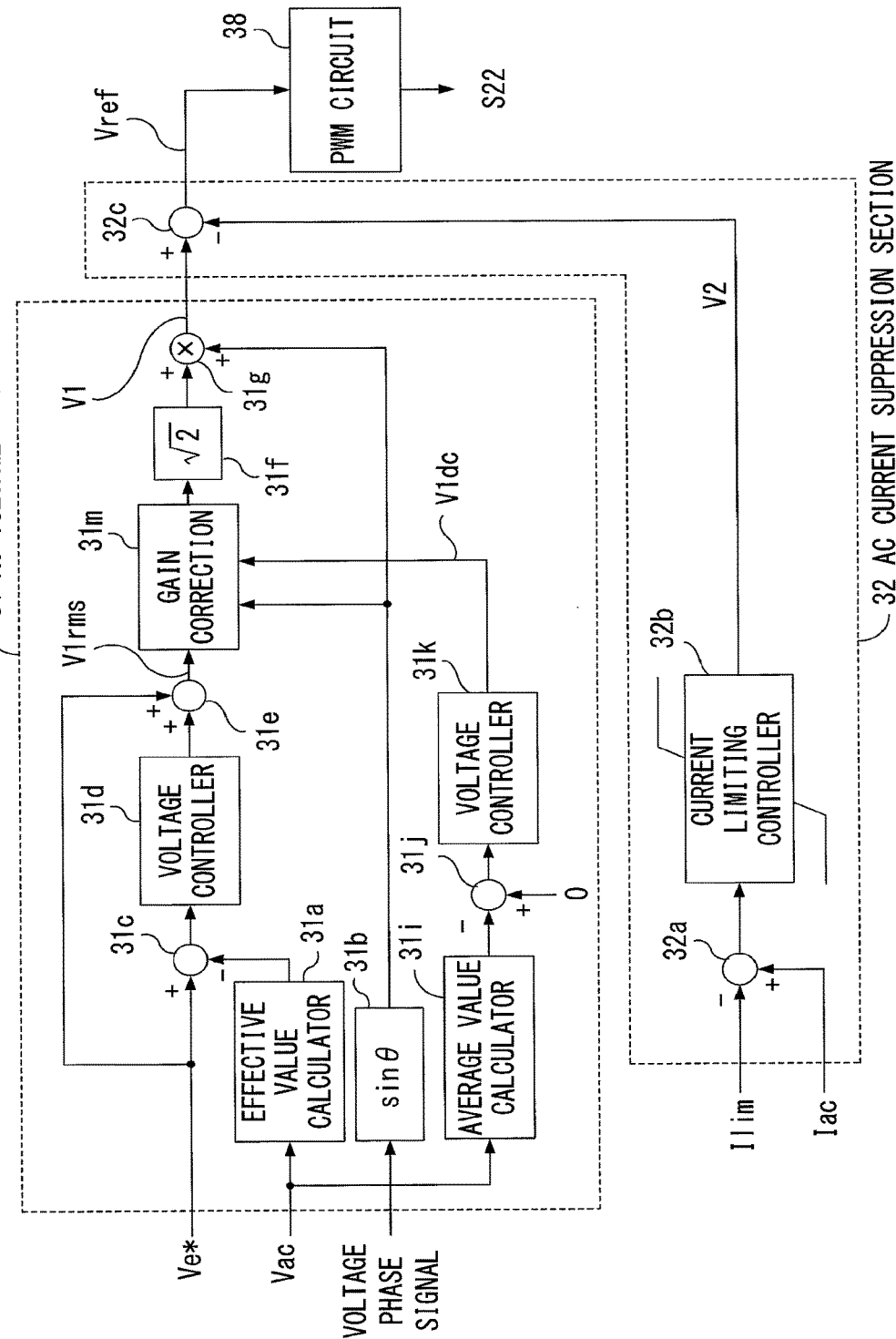
FIG. 11 is a control block diagram showing a modification of the AC voltage control section and the AC current suppression section of the power conversion device according to embodiment 4 of the present invention.

FIG. 11 is a control block diagram showing modification of the AC voltage control section and the AC current suppression section according to embodiment 4 of the present invention. The components that correspond to or are the same as those in the AC voltage control section and the AC current suppression section shown in FIG. 10 are denoted by the same reference characters.

The AC voltage control section 31 detects AC voltage outputted from the DC/AC conversion circuit 22 by the voltage sensor 202, calculates an effective value of the AC voltage detection value Vac by the effective value calculator 31*a*, and calculates a difference between the obtained effective value and the predetermined voltage effective value command value Ve* by the subtractor 31*c*. Next, by the voltage controller 31*d* and the adder 31*e*, the AC voltage control section 31 performs general feedback control such as proportional integral control, and feedforward control, so that the effective value of AC voltage coincides with the voltage effective value command value Ve*, thereby generating an effective value component V1*rms* of the AC voltage command signal V1.

In addition, the AC voltage control section 31 calculates an average value of the AC voltage detection value Vac by the average value calculator 31*i*, calculates a difference between the obtained average value and a predetermined voltage average command value (in FIG. 11, zero) by the subtractor 31*j*, and performs general feedback control such as proportional integral control so that the average value of AC voltage becomes zero, by the voltage controller 31*k*, thereby generating the DC component V1*dc* of the AC voltage command signal V1.

A gain corrector 31*m* of the AC voltage control section 31 corrects the effective value component V1*rms* of the AC voltage command signal V1 in accordance with the DC component V1*dc* of the AC voltage command signal V1. Specifically, the effective value component V1*rms* is divided into a voltage effective value component V1*rms*P for the case where the AC voltage command signal V1 is positive, and a voltage effective value component V1*rms*N for the case where the AC voltage command signal V1 is negative, and V1*rms*P and V1*rms*N are corrected as represented by expression (1) and expression (2), respectively. Here, k is an arbitrary coefficient that is greater than 0 and smaller than 1.

$$V1rmsP = V1rms \times (1+k) \times V1dc \qquad \text{Expression (1)}$$

$$V1rmsN = V1rms \times (1-k) \times V1dc \qquad \text{Expression (2)}$$

Next, by the root-of-two multiplier 31*f*, the voltage phase generator 31*b*, and the multiplier 31*g*, the AC voltage command signal V1 is generated.

Here, a "first voltage effective value calculator for calculating an AC voltage effective value when the AC voltage command value is positive" in claims corresponds to means for calculating V1*rms*P=V1*rms*×(1+k)×V1*dc* in Expression (1). A "second voltage effective value calculator for calculating an AC voltage effective value when the AC voltage command value is negative" in claims corresponds to means for calculating V1*rms*N=V1*rms*×(1−k)×V1*dc* in Expression (2). A "first correction gain" in claims corresponds to (1+k). A "second correction gain" in claims corresponds to (1−k).

As in embodiment 1, only when the absolute value of the AC current detection value Iac exceeds the current limit value Ilim, the AC current suppression section 32 starts operation to limit AC current outputted from the DC/AC conversion circuit 22, thereby reducing the amplitude of the AC voltage command signal V1. That is, the AC current suppression section 32 detects AC current outputted from the DC/AC conversion circuit 22 of the power conversion device 2 by the current sensor 211, and calculates a difference between the AC current detection value Iac and the current limit value Ilim given from the DC voltage shortage suppression section 33, by the subtractor 32*a*. Next, by the current limiting controller 32b, the AC current suppression section 32 performs general feedback control such as proportional integral control so that the AC current detection value Iac does not exceed the current limit value Ilim, thereby generating the voltage correcting signal V2. Next, the AC current suppression section 32 subtracts the voltage correcting signal V2 from the AC voltage command signal V1 outputted from the AC voltage control section 31, by the subtractor 32c, thereby generating the AC voltage command value Vref (=V1−V2) for the DC/AC conversion circuit 22.

Owing to the above configuration, a DC voltage component contained in AC voltage outputted from the power conversion device 2 can be suppressed. Therefore, even if a transformer-input-type load is connected as the load 3, magnetic saturation in the transformer can be prevented, and thus the power conversion device 2 with improved operation stability is achieved.

In addition, since a cycle with which AC voltage outputted from the power conversion device 2 becomes zero can be kept constant, it is possible to provide the power conversion device 2 that stably operates even when a load that requires detection of a cycle with which AC voltage becomes zero is connected as the load 3.

The present invention is not limited to the configurations in the above embodiments 1 to 4. Without deviating from the gist of the present invention, the configurations in the embodiments 1 to 4 may be combined, various modifications may be made to the embodiments 1 to 4, or the configurations may be partially abbreviated.

The invention claimed is:

1. A power conversion device comprising:
a power conversion circuit for converting DC power supplied from a DC power supply to AC power; and
a power conversion control section for controlling operation of the power conversion circuit so as to generate autonomous operation power as an AC voltage source in a parallel-off state from a power grid, wherein
the power conversion circuit includes: a DC-DC power conversion circuit for converting DC voltage of the DC power supply to DC link voltage; and a DC-AC power conversion circuit for converting the DC link voltage to AC voltage, and
the power conversion control section includes:
an AC voltage control section for controlling the AC voltage of the DC-AC power conversion circuit;
an AC current suppression section for limiting AC current of the DC-AC power conversion circuit to a predetermined current limit value or smaller;
a DC voltage shortage suppression section for, when the DC link voltage of the power conversion circuit reduces, in response to the reduction, reducing the current limit value to be given to the AC current suppression section;
a protection circuit for stopping operation of the power conversion circuit when at least one of the following conditions is satisfied:
the AC current suppression section has continued operation of limiting the AC current to the current limit value or smaller for a predetermined time or longer;
a state in which an AC voltage effective value obtained based on an AC voltage detection value detected by a voltage detection circuit which detects AC voltage outputted from the power conversion circuit is equal to or smaller than a predetermined threshold voltage, has continued for a predetermined time or longer; and
a state in which a difference voltage between an AC voltage command value generated by the AC voltage control section and an AC voltage instantaneous value obtained based on the AC voltage detection value detected by the voltage detection circuit which detects the AC voltage outputted from the power conversion circuit is equal to or greater than a predetermined threshold voltage, has continued for a predetermined time or longer.

2. The power conversion device according to claim 1, wherein the DC voltage shortage suppression section operates when the DC link voltage of the power conversion circuit becomes equal to or smaller than a predetermined DC voltage threshold value.

3. The power conversion device according to claim 2, wherein when the DC link voltage of the power conversion circuit becomes equal to or smaller than the predetermined DC voltage threshold value, the DC voltage shortage suppression section controls the current limit value so that the DC link voltage becomes the DC voltage threshold value.

4. The power conversion device according to claim 1, wherein the current limit value is caused to vary in a cycle synchronized with an AC voltage command value generated by the AC voltage control section.

5. The power conversion device according to claim 1, wherein the AC current suppression section generates a command value for causing an AC current detection value detected by a current detection circuit which detects AC current outputted from the power conversion circuit, to be equal to or smaller than the current limit value calculated by the DC voltage shortage suppression section, and adds or subtracts the command value to or from a command value generated by the AC voltage control section.

6. The power conversion device according to claim 1, wherein the AC voltage control section generates an AC voltage command value so that an effective value of an AC voltage detection value detected by a voltage detection circuit which detects AC voltage outputted from the power conversion circuit becomes a predetermined voltage effective value.

7. The power conversion device according to claim 1, wherein the AC voltage control section generates, through feedback control, an AC voltage command value so that an AC voltage detection value detected by a voltage detection circuit which detects AC voltage outputted from the power conversion circuit becomes a predetermined instantaneous voltage value.

8. The power conversion device according to claim 7, wherein, when the AC current suppression section operates, the AC voltage control section reduces an integral gain of the feedback control or makes the integral gain be zero.

9. The power conversion device according to claim 1, wherein the AC voltage control section includes a DC component suppression section for correcting an AC voltage command value so that an average value of AC voltage outputted from the power conversion circuit becomes zero.

10. The power conversion device according to claim 9, wherein the DC component suppression section adds or subtracts offset voltage to or from the AC voltage command value so that the average value of the AC voltage outputted from the power conversion circuit becomes zero.

11. The power conversion device according to claim 9, wherein
the DC component suppression section includes: a first voltage effective value calculator for calculating an AC voltage effective value of the power conversion circuit when the AC voltage command value is positive; a second voltage effective value calculator for calculating an AC voltage effective value of the power conversion circuit when the AC voltage command value is negative; a first correction gain for correcting the AC voltage command value when the AC voltage command value is positive; and a second correction gain for correcting the AC voltage command value when the AC voltage command value is negative, and the first correction gain and the second correction gain are variable so that the average value of the AC voltage outputted from the power conversion circuit becomes zero.

12. The power conversion device according to claim 1, wherein when the DC link voltage of the power conversion circuit is smaller than the predetermined DC voltage threshold value, the DC voltage shortage suppression section, in response to the reduction, reduces the current limit value to be given to the AC current suppression section.

13. The power conversion device according to claim 1, wherein the AC current suppression section operates only when the predetermined current limit value is smaller than the AC current of the DC-AC power conversion circuit.

14. The power conversion device according to claim 1, wherein the DC voltage shortage suppression section calculates a current correcting signal based on the DC link voltage and a DC voltage threshold value, and the predetermined current limit value is generated based on a predetermined AC current upper limit value and the calculated current correction signal.

15. The power conversion device according to claim 14, wherein the DC voltage shortage suppression section calculates a peak current limit value based on the AC current upper limit value and the current correcting signal, and multiples the peak current limit value by a sine-wave signal which is synchronized with the AC voltage command value, and outputs the multiplied value as the current limit value.

16. The power conversion device according to claim 1, wherein the AC voltage control section generates an AC voltage command signal based on AC voltage outputted from the DC/AC conversion circuit and a predetermined AC voltage command value.

* * * * *